United States Patent [19]
Dubbeld

[11] 3,838,955
[45] Oct. 1, 1974

[54] DEVICE FOR MAKING CHEDDAR CHEESE
[75] Inventor: Willem Dubbeld, Rotterdam, Netherlands
[73] Assignee: B. V. Hollandse Plastic Industrie Rotterdam, Rotterdam, Netherlands
[22] Filed: Feb. 2, 1972
[21] Appl. No.: 222,902

[30] Foreign Application Priority Data
Feb. 5, 1971   Netherlands........................ 7101593

[52] U.S. Cl..................... 425/84, 249/134, 249/113
[51] Int. Cl........................... A23c 19/02, B29c 1/04
[58] Field of Search ........... 249/112, 113, 141, 134; 425/84; 99/456, 458; 220/62

[56]  References Cited
UNITED STATES PATENTS
| | | | |
|---|---|---|---|
| 1,402,065 | 1/1922 | Griffin | 249/113 |
| 1,979,940 | 11/1934 | Janssens | 249/113 |
| 3,246,828 | 4/1966 | Branscum et al. | 229/30 |
| 3,446,415 | 5/1969 | Bromley | 229/30 |
| 3,514,857 | 6/1970 | Rossen | 249/141 X |
| 3,680,828 | 8/1972 | Swett | 249/134 |

FOREIGN PATENTS OR APPLICATIONS
| | | | |
|---|---|---|---|
| 881,992 | 11/1961 | Great Britain | 249/113 |
| 92,464 | 3/1962 | Denmark | 99/458 |
| 1,310,890 | 10/1962 | France | 99/458 |

*Primary Examiner*—J. Spencer Overholser
*Assistant Examiner*—David S. Safran
*Attorney, Agent, or Firm*—Eric H. Waters

[57]  ABSTRACT

A cheese mould for making pressed cheese, wherein the perforated moulding wall of the thermoplastic material, preferably polypropylene, consists of a base plate, which is provided with articulatedly connected lateral pieces, which pieces in the upright position with respect to the base plate, cover the circumferential wall of the cheese mould.

5 Claims, 5 Drawing Figures

PATENTED OCT 1 1974   3,838,955
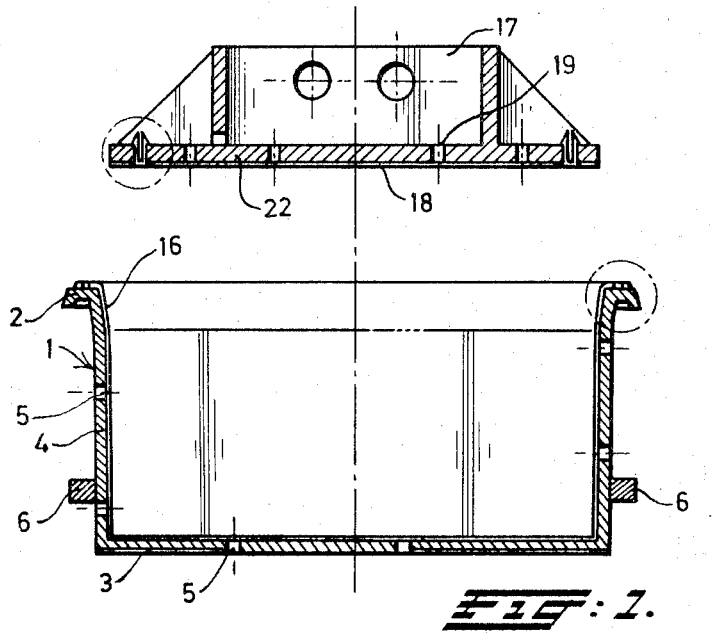
F1G:1.
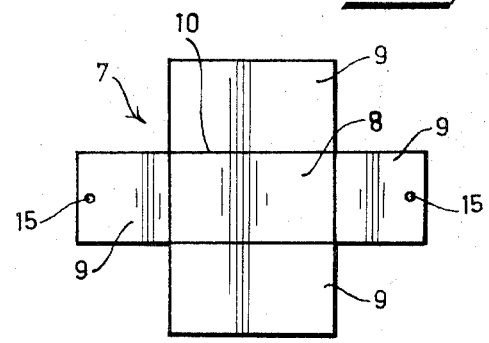
F1G:2.
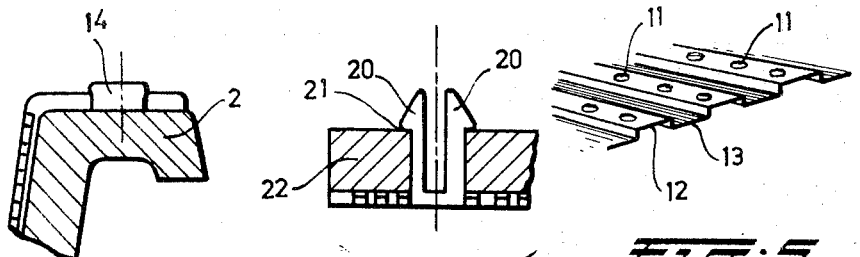
F1G:3.   F1G:4.   F1G:5.

DEVICE FOR MAKING CHEDDAR CHEESE

BACKGROUND OF THE INVENTION:

The invention relates to a cheese mould with a sieve-like perforated wall of sheet material for making cheese with a close cheese rind, particularly pressed cheese, without using a cheese cloth.

Cheese moulds with a sieve-like perforated wall of sheet material are commonly known. Stainless steel is then used as sheet material.

These cheese moulds have the drawback that they consist of various separate plates whereby the placement of the loose plates so as to form a cheese mould is rather time-consuming. Moreover, it is rather difficult to make square cheeses with sharp corners by means of such cheese moulds.

Another drawback is that since the cheese moulds are made of metal, mostly stainless steel they are rather and rather much labor is required for conveying and handling them.

Finally, many difficulties are experienced owing to the fact that the metal is easily deformed and indented, which deformations and indentations should be remedied since these deformations and indentations give rise to undesired impressions in the cheese.

SUMMARY OF THE INVENTION

It is an object of the invention to provide a cheese mould which does not exhibit these drawbacks and which is very suitable for the manufacture of square, and also round, cheese e.g. Cheddar cheese or Gouda cheese. In the process of making Cheddar cheese a mixture consisting of curds on which salt is sprinkled is compressed so as to form a cheese.

This object is attained according to the invention, by the arrangement in which the perforated wall of the cheese mould consists of a baseplate which is articulated to the lateral pieces which in the upright position cover the circumferential wall of the cheese mould, the base plate and the lateral pieces consisting of plastic.

Between the inner wall of the cheese mould and the moulding wall provided with perforations are drain grooves for the discharge of moisture. These drain grooves are advantageously provided on the moulding wall which is perforated like a sieve.

It is preferable to provide the upper end of the cheese mould with protruding parts which cooperate with recesses in the sieve-like perforated moulding wall, whereby the moulding wall is secured in position in the cheese mould.

The aforementioned perforated moulding wall has various advantages. In the first place cheese with very sharp corners can be made, while before and behind the moulding wall a very good drainage can be obtained. The moulding wall can be easily removed since it constitutes an entirety, the whole is light in weight, easily handled and cleaned and, due to the resilience of the material, no deformations or indentations are produced.

The upper end of the mould is advantageously provided with an upwardly and outwardly inclined circumferential marginal part serving as a guide edge for introducing the cheese into the mould after pressing, i.e. the so-called turning of the cheese.

BRIEF DESCRIPTION OF THE DRAWINGS:

FIG. 1 is a cross section taken through a cheese vessel with a moulding wall, provided with perforations and an associated follower element.

FIG. 2 is a development of a blank of the perforated moulding wall applied in a cheese mould according to the invention;

FIG. 3 is a cross-section of a detail of the cheese mould according to FIG. 1 in which is shown how the perforated moulding wall is secured in position;

FIG. 4 is a cross-section of a detail of FIG. 1, in which is represented how the perforated moulding wall is secured to the follower element; and FIG. 5 is a perspective view of a part of the perforated moulding wall being applied.

DESCRIPTION OF PREFERRED EMBODIMENTS

Represented in FIG. 1 is a cheese mould 1 with a circumferential upper edge 2, a bottom 3 and an upright wall 4, openings 5 being provided in the bottom and the upright walls 3. The cheese mould can further be provided with stiffening rings 6 which cooperate with the upright walls 4. These stiffening rings are efficiently applied to plastic cheese moulds e.g. made of polyethylene.

In the cheese mould 1, a sieve-like perforated moulding wall 7 is provided made of polypropene, represented in the shape of a blank in FIG. 2.

This moulding wall 7 consists of a baseplate 8 corresponding to the surface of the bottom 3 of the cheese mould 1 and in this case four lateral folding pieces which are integral with the base plate 8. The sieve-like perforated moulding wall 7 is preferably made of polypropene, so that a hingeable connection can be easily obtained along a fastening edge 10 between the baseplate 8 and the part 9 which, in the case of a square mould, will come to lie against the upright walls 4. If desired, the plastic can be reinforced by glass fibres.

It is however, obvious that instead of square moulds, circular moulds also can be used, wherein the baseplate 8 has a circular section, while the upright wall parts 9 are adapted in such a way that in a vertical position they constitute a cylindrical surface.

The provision of the hinging fastening edges 10 can be easily effected in that upon forming a polypropene moulding wall 7 longitudinal lines of weakness or creases are provided whereby an excellent articulation can be obtained without the aid of other means.

The sieve-like perforated moulding wall is represented in detail in FIG. 5 in which it is seen that round perforations 11 of a diameter, for example of 0.7 mm are formed in channels 12, and communicate with the underside of the perforated moulding wall, between adjacent ribs 13. Although the perforations are shown as circular they could also be square. The number of perforations ranges from 5 to 10 per $cm^2$. It is obvious that the cheese mould can also be provided with such ribs 13 and that a sieve-like perforated moulding wall can be disposed in such a cheese mould. In that case the upright ribs 13 are not connected with the unfolded moulding wall 7, but with the inner wall of the cheese mould. This is, however, not advisable when the cheese mould, after removal of the moulding wall, is used for repressing the moulded cheese. The ribs are then impressed into the cheese.

It is also possible to provide the sides of the moulding wall which are in contact with the cheese, with a structure, but this is not compulsory although a cheese cloth structure is recommendable.

Instead of a plate, one may use a fabric as well, and in this fabric the articulated edges 10 are again provided and the sieve-like perforated moulding wall 7 contacts the inner surface of the cheese mould, the arrangement being such that draining channels are formed between the inner side of the cheese mould and the surfaces of the moulding wall facing this inner side.

The upper edge 2 of the cheese mould 1 is furnished with protruding cams 14, while the parts 9 are provided with recesses 15 in which the protruding cams can engage. In this way the sieve-like perforated moulding wall is well fixed in position in the cheese mould.

The cheese mould is finally provided, in the proximity of the circumferential wall, with a tapering wall part 16 serving as a guide edge for introducing the cheese, after removal of the inner mould and repressing, the so called turning operation.

The cheese mould according to the invention additionally comprises a follower element 17 which likewise is provided with a plate-shaped material in the shape of the perforated moulding wall 7. This material is denoted by the reference 18. In the upper end of the follower element are openings 19 for discharging the moisture.

In order to secure the perforated wall 18 to the follower element 17 a snap connection can be used, an embodiment of which is represented in FIG. 4. The moulding wall can be fixedly secured to the follower element by means of resiliently mounted uprights parts 20 with bent over edges 21 protruding through an opening provided in a wall 22 of the follower element.

It is obvious that instead of a square cheese mould, a cheese mould with any other cross-section can be used, while relating the perforated moulding walls to the cheese mould.

In making cheese, the procedure is as follows:

The perforated moulding wall 7 is disposed in the cheese mould 1, and the bottom plate 8 contacts the bottom 3 of the cheese mould 1 and the upright wall parts 9 come to bear against the inner surface of the upright walls 4 of the cheese mould 1.

Simultaneously the protruding cams 14 are pressed through openings 15 of the upright parts 9.

Thereupon, the curd is pressed from above by the follower element. Due to the pressure, the moisture will escape from the curds and flow through the perforations 11 into the channels therebeneath and flow off through the openings 5.

At the upper end too, moisture can be removed through the space beneath channels 12, which channels 12 adjoin the apertures 19.

After pressing the cheese, the same is removed from the mould with the perforated moulding wall 7. The plate 8 and the parts 9 are separated from the cheese and thereupon the cheese is inverted and again introduced into the cheese mould. In order to facilitate the introduction of the cheese into the cheese mould, the guide edge 16 is provided. The cheese is pressed again and is then ready for further treatment.

Ejectors can be used for removing the cheese from the mould, in which case the ejectors are pushed through the apertures 5.

The material of the cheese mould consists advantageously of a thermoplastic synthetic compound, either reinforced or not, while the perforated moulding wall consists preferably of a thermoplastic synthetic compound such as polypropene or polyethylene, preferably polypropene.

Glass fibre reinforced thermosetting and thermoplastic plastics are also within the scope of the invention. Preferably plastics are used are produced by injection moulding since these plastics are very much adapted to the manufacture of the desired moulding plates.

What I claim is:

1. A cheese mould comprising a hollow body of thermoplastic material with a circumferential wall, a sieve-like perforated moulding wall of sheet material removably supported in said hollow body for making pressed cheese without using a cheese cloth, said perforated wall comprising a baseplate, and lateral parts hingedly connected with the baseplate, the hingeable connection being formed by the provision of a reduced wall thickness between the baseplate and the lateral parts, said lateral parts having an upright position on the baseplate in which the lateral parts cover the circumferential wall of the hollow body, said baseplate and lateral parts consisting of a thermoplastic material, said hollow body having an upper edge and including protruding parts on said upper edge which co-operate with recesses provided in the perforated wall to support the same in said upright position, and a stiffening ring on said hollow body at the lower part thereof to prevent deformation of the thermoplastic material of said hollow body, said perforated moulding wall including corrugations defining ribs and channels which form grooves for discharging the moisture between the wall of the hollow body and the sieve-like perforated moulding wall.

2. A device according to claim 1, wherein said perforated moulding wall has draining grooves opening into the channels.

3. A device according to claim 1, wherein the circumferential wall of the hollow body has an upper portion which tapers downwardly from the circumferential edge over a short distance.

4. A device according to claim 1 wherein the plastic material of the perforated moulding wall is reinforced.

5. A device according to claim 1 wherein said thermoplastic material of the moulding wall is polypropylene.

* * * * *